United States Patent
Chen et al.

(10) Patent No.: US 10,437,205 B2
(45) Date of Patent: Oct. 8, 2019

(54) CONTROL SYSTEM AND CONTROL METHOD OF MANUFACTURING INJECTION MOLDING PRODUCTS

(71) Applicant: CHUNG YUAN CHRISTIAN UNIVERSITY, Taoyuan County (TW)

(72) Inventors: Shia-Chung Chen, Taoyuan County (TW); Chia-Yen Tseng, Hsinchu County (TW); Yung-Hsiang Chang, Taoyuan County (TW); Kuan-Hua Lee, Taoyuan County (TW)

(73) Assignee: CHUNG YUAN CHRISTIAN UNIVERSITY, Taoyuan County (TW)

( * ) Notice: Subject to any disclaimer, the term of this patent is extended or adjusted under 35 U.S.C. 154(b) by 780 days.

(21) Appl. No.: 14/873,779

(22) Filed: Oct. 2, 2015

(65) Prior Publication Data
US 2017/0095960 A1   Apr. 6, 2017

(51) Int. Cl.
*B29C 45/76* (2006.01)
*G05B 15/02* (2006.01)

(52) U.S. Cl.
CPC ............ *G05B 15/02* (2013.01); *B29C 45/766* (2013.01); *B29C 2945/76498* (2013.01); *B29C 2945/76551* (2013.01); *B29C 2945/76595* (2013.01); *B29C 2945/76658* (2013.01); *B29C 2945/76735* (2013.01); *B29C 2945/76829* (2013.01); *B29C 2945/76859* (2013.01); *B29C 2945/76892* (2013.01); *B29C 2945/76936* (2013.01); *B29C 2945/76993* (2013.01)

(58) Field of Classification Search
None
See application file for complete search history.

(56) References Cited

U.S. PATENT DOCUMENTS

| | | | |
|---|---|---|---|
| 2004/0093114 A1* | 5/2004 | Magario | B29C 45/76 700/197 |
| 2006/0052984 A1* | 3/2006 | Nakadate | G06F 17/50 702/182 |

(Continued)

OTHER PUBLICATIONS

Matthew H. Naitove, "Benchmarking Simulation Software: How One Molder Did It", Plastics Technology, www.ptonline.com/ articles. Article Post Date: Oct. 25, 2011.*

(Continued)

*Primary Examiner* — Matthew J Daniels
*Assistant Examiner* — Mohammad M Ameen
(74) *Attorney, Agent, or Firm* — WPAT, PC (57) ABSTRACT

A control system and a control method of manufacturing injection molding products are provided. The control system includes an injection molding machine, an information input interface, a computing server and a data conversion device. At first, product information is inputted through the information input interface. The product information is transmitted to the computing server, and then the computing server determines injection molding parameters according to the product information. The injection molding parameters are transmitted to the information input interface. After data conversion through the data conversion device, the injection molding machine is controlled to manufacture the injection molding products according to the converted injection molding parameters.

12 Claims, 5 Drawing Sheets

(56) References Cited

U.S. PATENT DOCUMENTS

| | | | | |
|---|---|---|---|---|
| 2009/0292389 A1* | 11/2009 | Jung | ................ | G05B 19/0426 |
| | | | | 700/117 |
| 2011/0106288 A1* | 5/2011 | Catoen | ................... | B29C 45/76 |
| | | | | 700/108 |
| 2014/0200710 A1* | 7/2014 | Chang | ............... | B29C 45/7693 |
| | | | | 700/197 |

OTHER PUBLICATIONS

Jyh-Cheng Yu et al., "Computer aided design for manufacturing process selection", Journal of Intelligent Manufacturing (1993) vol. 4, p. 199-208.*

Moldex3D Brochure—Leadership in True 3D CAE Technology, www.moldex3d.com. © 2013.*

Raymond H. Myers et al.: Response Surface Methodology: process and product optimization using designed experiments, 3rd Edition, John Wiley & Sons, p. 9, © 2009.*

* cited by examiner

CONTROL SYSTEM AND CONTROL METHOD OF MANUFACTURING INJECTION MOLDING PRODUCTS

FIELD OF THE INVENTION

The present disclosure relates to a control system and a control method of manufacturing plastic products, and more particularly to a control system and a control method for injection molding industry.

BACKGROUND OF THE INVENTION

Injection molding is a known manufacturing process for years and is widely used for manufacturing a variety of parts, e.g. housings of 3C products or devices, containers, mechanical parts and toys. The injection molding products encompass all possible sizes. This inexpensive, quick and easy manufacturing process is advantageous to mass production.

In an injection molding process, material of the products is fed into a heated barrel, mixed, and forced into a mold cavity. After cooling, the material solidifies into a shape conforming contour of the mold cavity. Finally, the products are obtained by a demolding process. The quality of the injection molding products is affected by parameters of the injection molding process. These parameters should be strictly controlled during the injection molding process and little deviation may adversely affect the quality of the injection molding products, even cause production failure. The optimum parameters are not fixed for various products and ambient conditions. Therefore, the parameters are usually adjusted by an experienced operator, and different operators, however, may adopt different parameters. It means that the injection molding processes are not always well controlled. Sometimes, trial runs would be made in advance to reduce production loss in the normal production. Besides, human error is probably inevitable. It is quite inefficient to adjust the injection molding parameters according to personal experience.

Therefore, an efficient control system and an efficient control method of manufacturing injection molding products are desired.

SUMMARY OF THE INVENTION

An aspect of the present disclosure provides a control system of manufacturing injection molding products. The control system includes an injection molding machine, an information input interface, a computing server and a data conversion device. Product information of the injection molding products is inputted through the information input interface and than transmitted to the computing server. The computing server receives the product information transmitted from the information input interface, determines injection molding parameters according to the product information, and transmits the injection molding parameters to the information input interface. The data conversion device converts the injection molding parameters from the information input interface. The converted injection molding parameters have a data format acceptable by the injection molding machine so that the injection molding machine is controlled to manufacture the injection molding products according to the converted injection molding parameters.

In an embodiment, the injection molding parameters include a melting temperature, a mold temperature, a filling time, an injection velocity, an injection pressure, a packing pressure, a packing time and a cooling time.

In an embodiment, the information input interface is a server or a computer. The computing server is a cloud server or a workstation.

In an embodiment, the control system further includes a portable device in communication with the information input interface and the computing server. The control system receives and shows the injection molding parameters on a display of the portable device. The portable device provides an input window through which the injection molding parameters received from the computing server are adjusted. The portable device is a tablet computer, a notebook computer, a smart communication apparatus or a personal digital assistant.

In an embodiment, the control system further includes a monitor module. The monitor module monitors the injection molding machine and actuates the information input interface to adjust the injection molding parameters.

Another aspect of the present disclosure provides a control method used with a control system of manufacturing injection molding products in an injection molding process. According to the control method, product information of the injection molding products is inputted through an information input interface. The injection molding parameters of the injection molding process are determined by a computing server according to the product information from the information input interface. Then, the injection molding parameters are transmitted to the information input interface. After data conversion with a data conversion device, the converted injection molding parameters have a data format acceptable by the injection molding machine. Therefore, the injection molding machine is controlled to manufacture the injection molding products according to the converted injection molding parameters.

In an embodiment, the control method further includes a step of adjusting the determined injection molding parameters.

In an embodiment, the control method further includes steps of: monitoring the injection molding machine to obtain a monitoring result; and actuating the information input interface to adjust the injection molding parameters according to the monitoring result

BRIEF DESCRIPTION OF THE DRAWINGS

The advantages of the present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

To manufacture plastic products by an injection molding process, it is desired that the parameters of the injection molding process can be determined and controlled automatically with standardization to avoid human error.

Figure 1:
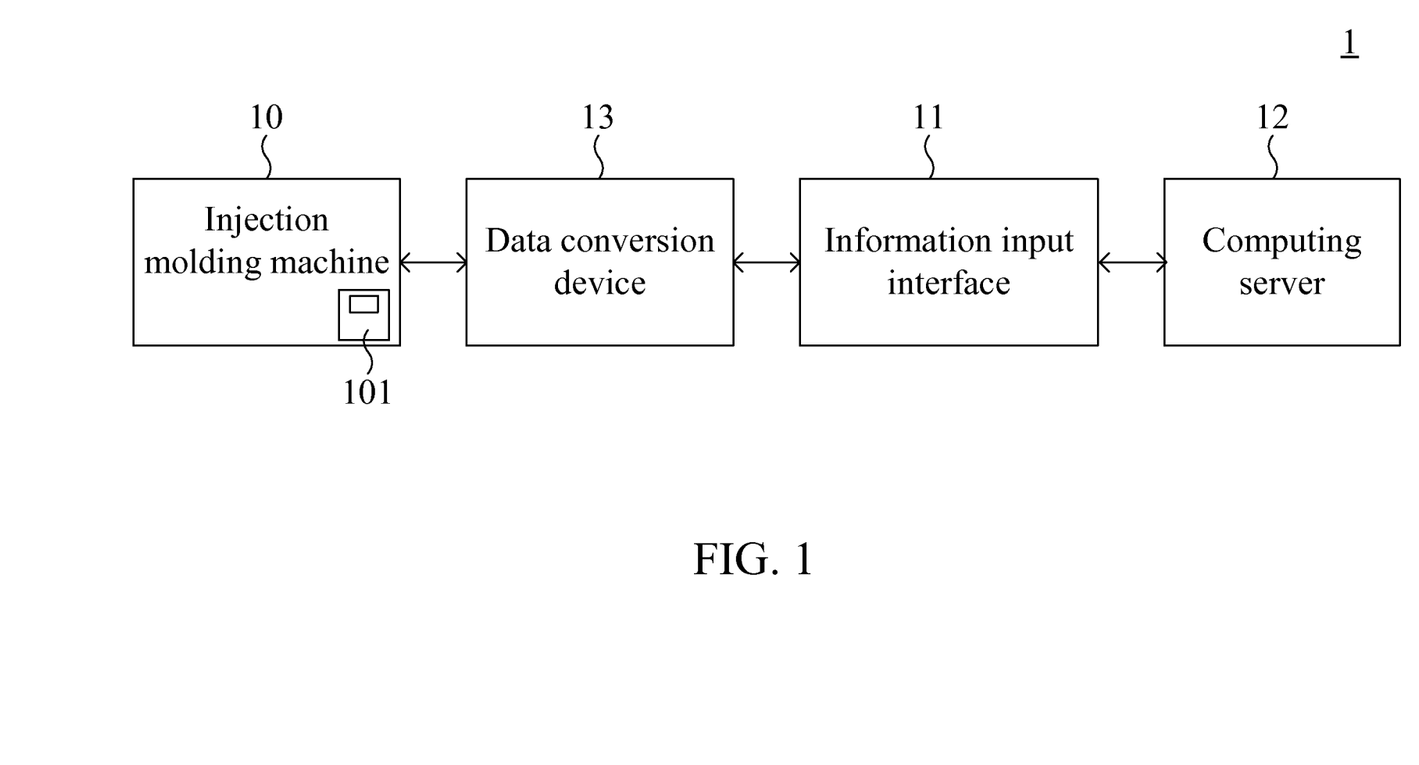
FIG. 1 is a functional block diagram illustrating a control system of manufacturing injection molding products according to an embodiment of the present invention.

Please refer to FIG. 1, a schematic diagram illustrating a control system for manufacturing injection molding products according to an embodiment of the present invention. The control system 1 includes an injection molding machine 10, an information input interface 11, a computing server 12 and a data conversion device 13. The injection molding machine 10 may be a common injection molding machine which is used to form plastic products based on injection molding technology. There is a control panel 101 disposed on or coupled to the injection molding machine 10. The operator can input or adjust various injection molding parameters through the control panel 101, and the control panel 101 issues control signals to control the production conditions of the injection molding machine 10 according to the input injection molding parameters.

At first, product information is inputted through the information input interface 11. The product information includes a product length, a projection area, a product thickness, a product volume and a material of the injection molding products. This step may be considered as "describing the injection molding product". Most of the information may be obtained by observing or measuring contours of the injection molding product. Sometimes, the injection molding product may be described in sections due to local thickness, shape or other requirements. In this condition, more than one set of product information is inputted. Furthermore, the information input interface 11 can directly obtain the product information via a 3D image of the injection molding product which is inputted to or acquired by the information input interface 11. More product information may be inputted to assist in optimum parameter determination, e.g. gate thickness/diameter, runner volume ratio, average distance between pipe and mold surface, and model number of the injection molding machine.

The information input interface 11 may be a server or a computer which can receive information input and transmit necessary data. The information input interface 11 is connected to a network system, e.g. the internet, the intranet, the local area network (LAN), the wide area network (WAN) in a wired or wireless manner. Thus, the information input interface 11 can transmit the product information to a local device or a remote device.

Figure 2:
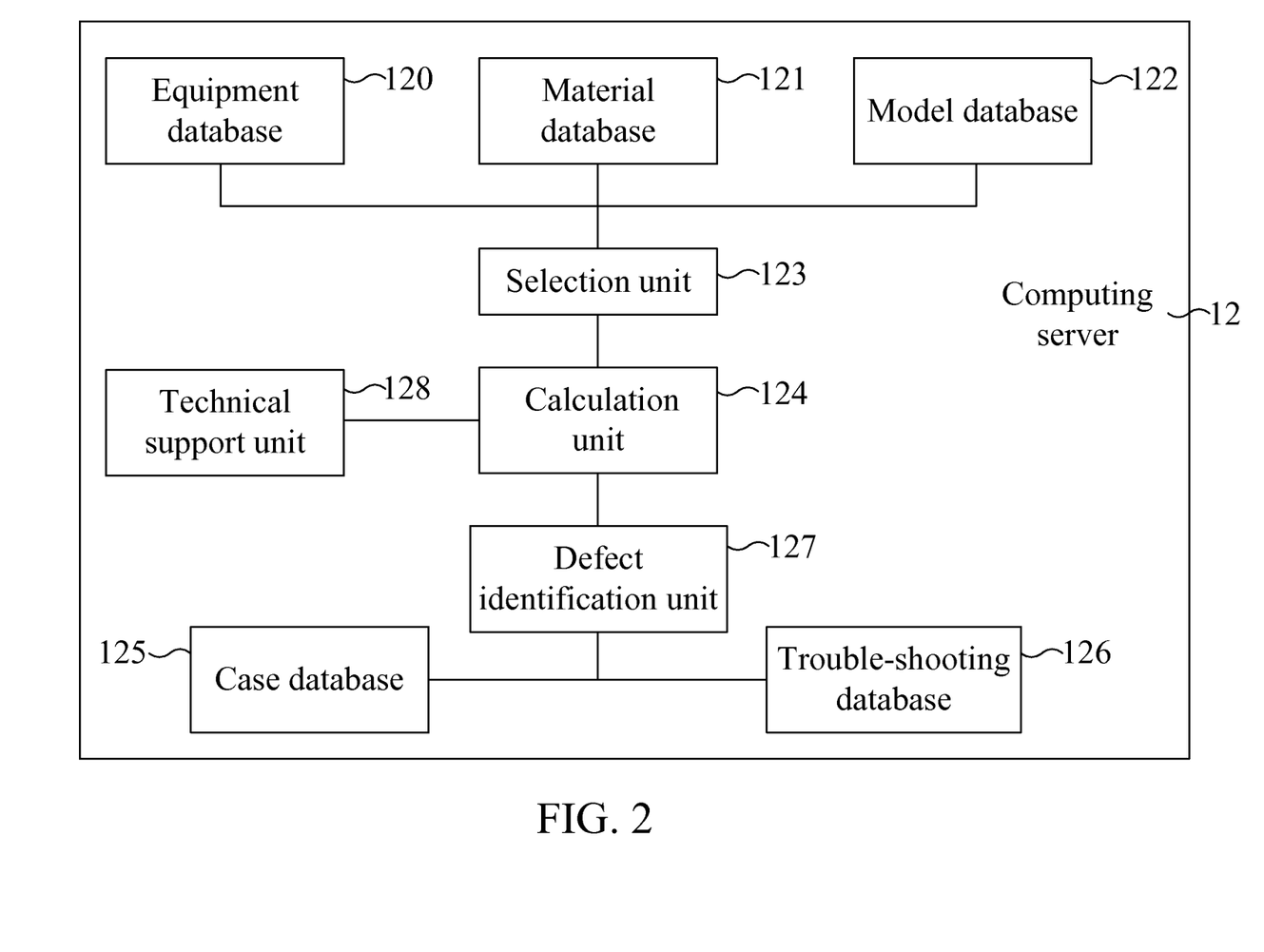
FIG. 2 is a function block diagram illustrating the computing server of the control system in FIG. 1.

The computing server 12 is in communication with the information input interface 11 through the network system. For example, the computing server 12 is a workstation or a cloud server taking advantage of cloud computing technology. The computing server 12 receives the product information from the information input interface 11 and determines the injection molding parameters of the injection molding machine 10. The injection molding parameters include a melting temperature, a mold temperature, a filling time, an injection velocity, an injection pressure, a packing pressure, a packing time and a cooling time. The parameters are than sent to the information input interface 11. In an embodiment, the computing server 12 includes an equipment database 120, a material database 121, a model database 122, a selection unit 123 and a calculation unit 124, as shown in FIG. 2.

The equipment database 120 records data of injection molding machines, data of mold temperature control units, data of automatic control units, data of gas counter pressure units, data of induction heating control units, data of feed screw diameter, data of feed screw stroke, data of feed screw speed, data of feed screw aspect ratio, data of injection capacity, data of injection rate, data of injection velocity, data of injection pressure, data of clamp force, data of clamp stroke, data of mold height and data of platen size.

The material database 121 records data of materials, data of drying temperature, data of drying time, data of melting temperature, data of mold temperature, data of back pressure, data of feed screw speed, data of vent depth, data of specific gravity, data of plastic molding shrinkage, data of melt flow rate and data of tensile modulus.

The model database 122 records data of material types, data of thickness, data of length/thickness ratio, data of melting temperature, data of mold temperature, data of filling time, data of injection pressure, data of packing pressure and data of packing time.

The selection unit 123 of the computing server 12 is in communication with the equipment database 120, the material database 121 and the model database 122. It selects or acquires required data which are related to the injection molding process from the equipment database 120, the material database 121 and the model database 122, and the selected or acquired data are transmitted to the calculation unit 124. The calculation unit 124 calculates the injection molding parameters of the injection molding machine 10 for manufacturing the specified products. The injection molding parameters include a melting temperature, a mold temperature, a filling time, an injection velocity, an injection pressure, a packing pressure, a packing time, and a cooling time.

The computing server 12 may further include a case database 125, a trouble-shooting database 126 and a defect identification unit 127. In an embodiment, the case database 125 records data of case classification, data of materials, data of injection molding machines, data of shot size, data of stroke, data of melting temperature, data of mold temperature, data of filling time, data of back pressure, data of injection pressure, data of packing pressure, data of packing time, data of cooling time and data of clamp force.

The trouble-shooting database 126 records data of short shot, data of flash, data of shrink mark, data of weld line, data of flow mark, data of jetting, data of void, and data of warpage.

The defect identification unit 127 is in communication with the case database 125 and the trouble-shooting database 126. It receives data from the case database 125 and/or the trouble-shooting database 126 to enable the calculation unit 124 to adjust or fine-tune the calculated injection molding parameters if the first calculated injection molding parameters may cause production failure according to the data recorded in the case database 125 and the trouble-shooting database 126. Therefore, better injection molding parameters can be provided.

The computing server 12 may further include a technical support unit 128. The technical support unit 128 provides an online interactive service. The operator can seek instant advice from at least one injection molding expert connected to the technical support unit 128 through the information input interface 11 so as to overcome any problem occurring during the injection molding process.

Then, the calculated or modified injection molding parameters are transmitted to the information input interface 11. Please refer back to FIG. 1. After the information input interface 11 receives the injection molding parameters, the operator can see or monitor the injection molding parameters through a display (not shown) of the information input interface 11. In a specific condition, the operator is allowed to adjust the injection molding parameters through the information input interface 11 based on environment conditions.

Since various injection molding machines 10 are provided by different manufacturers, the input format of the injection molding parameters may vary. For this reason, at least one data conversion device 13 is provided between the injection molding machine 10 and the information input interface 11. The data conversion device 13 is in communication with the injection molding machine 10 and the information input interface 11 in a wired or wireless manner. The data conversion device 13 can convert the injection molding parameters into proper data format accepted by the specific injection molding machine 10. The injection molding machine 10 or the control panel 101 of the injection molding machine 10 receives the converted injection molding parameters, i.e. the melting temperature, the mold temperature, the filling time, the injection velocity, the injection pressure, the packing pressure, the packing time and the cooling time, and issues control signals according to the converted injection molding parameters to control the production conditions of the injection molding machine 10. The injection molding parameters may be shown on the control panel 101 so that the operator can see or monitor the values of the injection molding parameters.

When a plurality of injection molding machines are arranged in a factory, each injection molding machine may correspond to a respective data conversion device in a one-to-one manner. Alternatively, a data conversion device supporting various data conversion is provided to cooperate with the injection molding machines in a one-to-many manner. In this condition, the data conversion device 13 may assign a virtual IP address to each injection molding machine 10 to serves as a host. The data conversion device 13 may be further connected to mold temperature controllers, material dryers, hot runners and other equipments used in the injection molding process so as to simultaneously perform data conversion for the various kinds of equipments. In a further embodiment, several data conversion devices work in a one-to-one manner, and other data conversion devices work in a one-to-many manner.

The data conversion device 13 may be implemented by a system on a chip (SoC). The data conversion device 13 can set the number, the definition and the frequency of the output signals/parameters. Furthermore, the data conversion device 13 can receive different data types of input signals and perform proper data conversion for various connected equipments. Due to the data processing by the data conversion device 13, packet loss can be avoided and the data transmission loading to the equipments is reduced.

Figure 3:
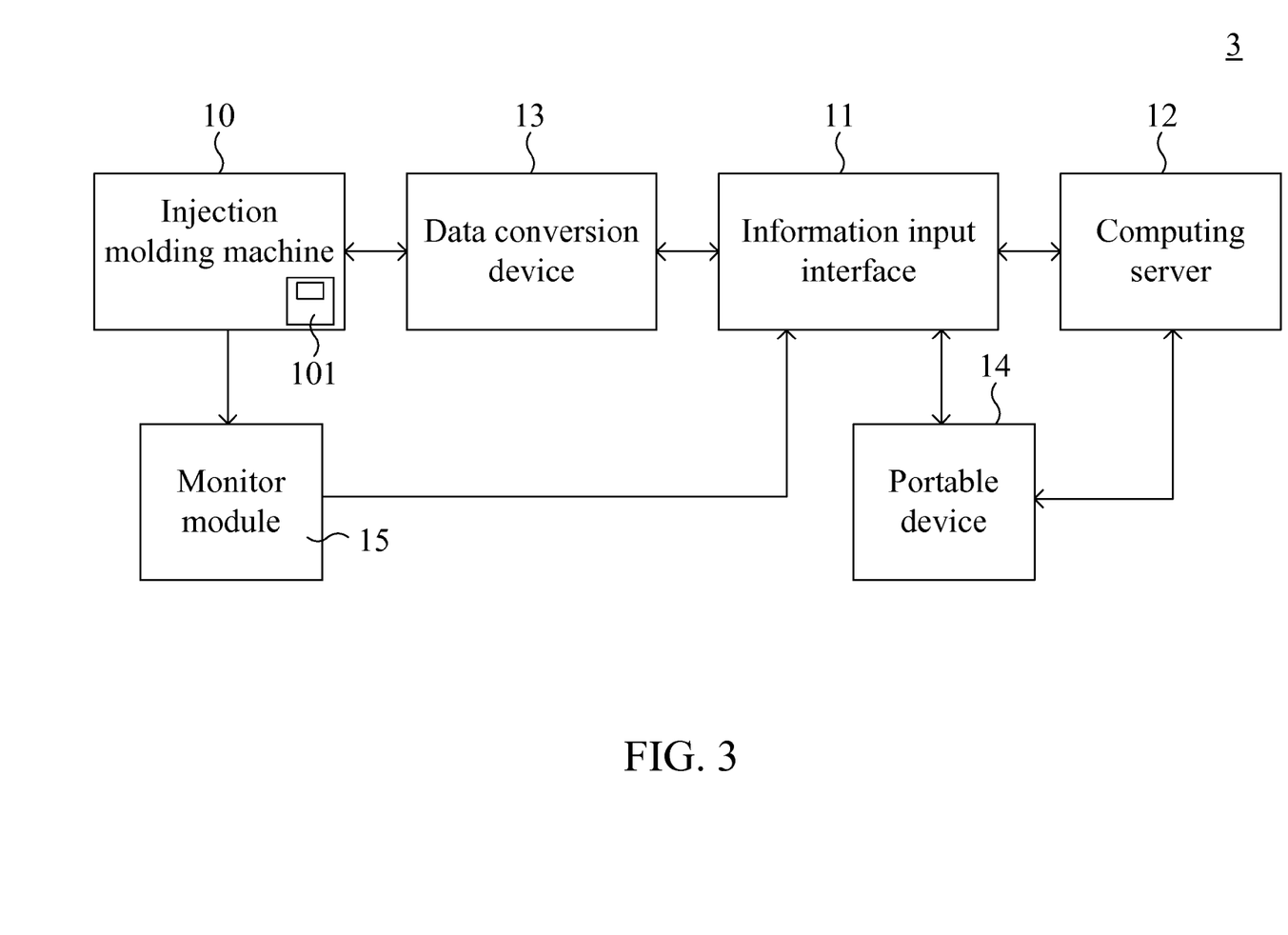
FIG. 3 is a functional block diagram illustrating a control system of manufacturing injection molding products according to another embodiment of the present invention.

Please refer to FIG. 3, a functional block diagram illustrating a control system of manufacturing injection molding products according to another embodiment of the present invention. The control system 3 may further include a portable device 14 in communication with the information input interface 11 and the computing server 12. The portable device 14 may be a tablet computer, a notebook computer, a smart communication apparatus, a personal digital assistant (PDA) or other portable device having a display (not shown). The calculated or modified injection molding parameters may be transmitted to the portable device 14 and shown on the display. Thus, the operator or a manager can obtain the injection molding parameters from the computing server 12 with greater mobility. If the manager has the power of adjusting the injection molding parameters, the manager can adjust the injection molding parameters through the portable device 14. Then, the adjusted injection molding parameters are sent to the information input interface 11 for data conversion and machine control as described above.

Figure 4:
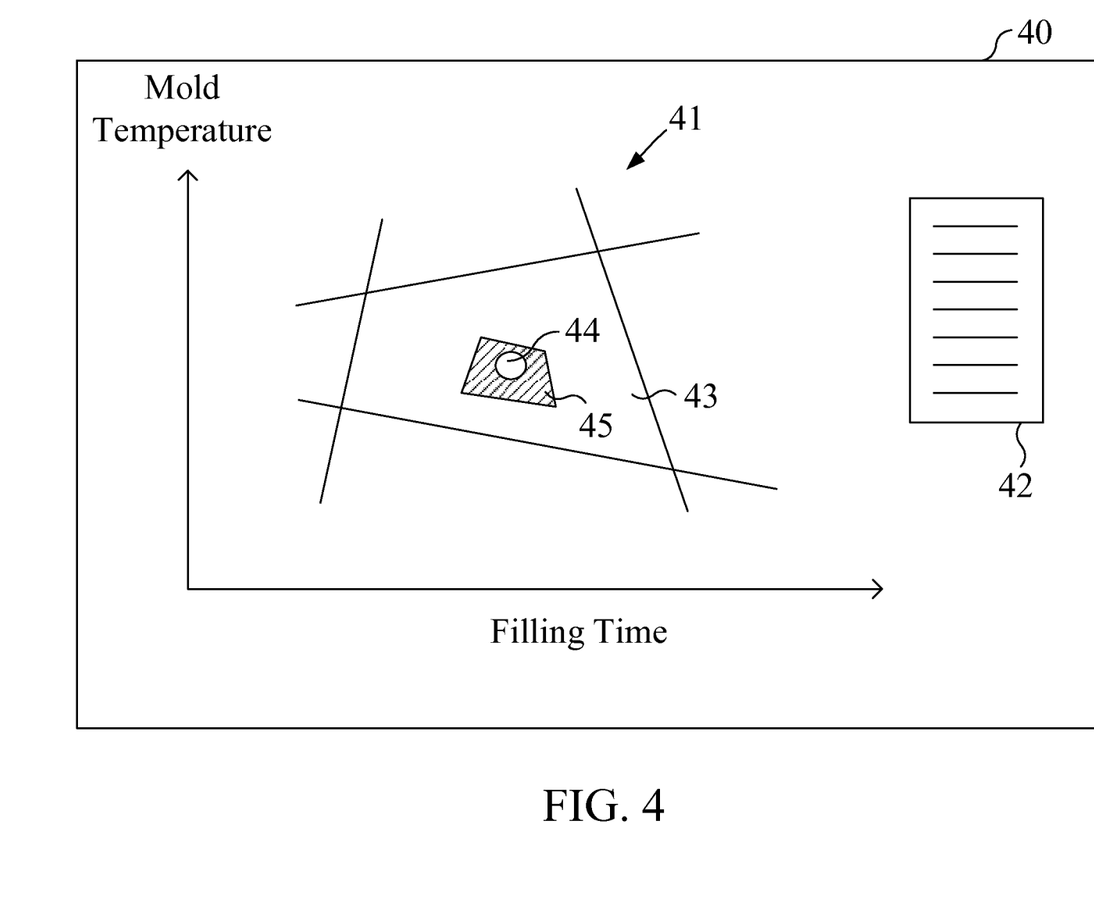
FIG. 4 is a schematic diagram showing an input window used with the control system of the present disclosure.

Since there are eight injection molding parameters in the injection molding process, it is difficult to consider all the injection molding parameters while adjusting them. The present disclosure provides a new input window. Please refer to FIG. 4 illustrating the input window which is shown on the display of the information input interface 11 or the portable device 14. The input window 40 includes an input coordinate system 41 and a parameter box 42. The x-coordinate and the y-coordinate of the coordinate system 41 represent two parameters of the injection molding parameters, respectively. In FIG. 4, the x-coordinate represents the filling time and the y-coordinate represents the mold temperature, but the user may select any two injection molding parameters for the input coordinate system. In the coordinate system 41, there is a reasonable region 43 enclosed by four straight lines (or curves). The conditions within the reasonable region 43 are operable and the input should be restricted within the reasonable region 43. The points located outside the reasonable region 43 are not considered because thermal degradation, flash or short shot will occur. Sometimes, an optimum area 45 may be provided to assist in parameter adjustment After the information input interface 11 or the portable device 14 receives the injection molding parameters, the values of the injection molding parameters are shown in the parameter box 42. An operation point 54 corresponding to the determined mold temperature and the filling time is shown in the input coordinate system 41. The operator or the manager can touch and move the point 44 within the reasonable region 43 to adjust the production conditions to meet specific requirements. In response to the adjustment, the injection molding parameters other than the mold temperature and the filling time also change according to predetermined relations to the injection molding parameters provided by the computing server 12. The values of the injection molding parameters shown in the parameter box 52 are updated in real time so that the user can observe the adjustment of the injection molding parameters. Finally, the adjusted injection molding parameters are sent to the data conversion device 13 (through the data input interface 11) after confirmation given by the operator or the manager for data conversion and machine control as described above.

Please refer back to FIG. 3, a monitor module 15 may be further provided. The monitor module 15 is in communication with the injection molding machine 10 and the information input interface 11. The monitor module 15 senses and monitors the actual values of the injection molding parameters of the injection molding machine 10, e.g. the mold temperature and the injection pressure, and compares the actual values with the determined injection molding parameters to obtain a monitoring result. For example, if the difference between the actual values with the determined injection molding parameters exceeds a threshold, the monitor module 15 raises an alarm to actuate manual or automatic parameter adjustment through the information input interface 11. Alternatively, the monitor module 15 compares average actual values of the injection molding parameters of the injection molding machine 10 during several production cycles or a predetermined time period with the determined injection molding parameters. The monitor module 15 gives an alarm if the error exceeds a threshold. Then, the parameter adjustment is performed through the information input interface 11.

According to the present control system, the parameter determination for the injection molding process is systemized and automated. The parameter determination does not rely on individual's experience and is much reliable. The injection molding process is not affected due to human error or lack of experience so that the control efficiency is enhanced. In addition to the parameter determination, the cloud server may collect huge data of different injection molding processes provided by many information input interfaces to perfect the databases, which is advantageous to improve the optimum parameter determination.

Figure 5:
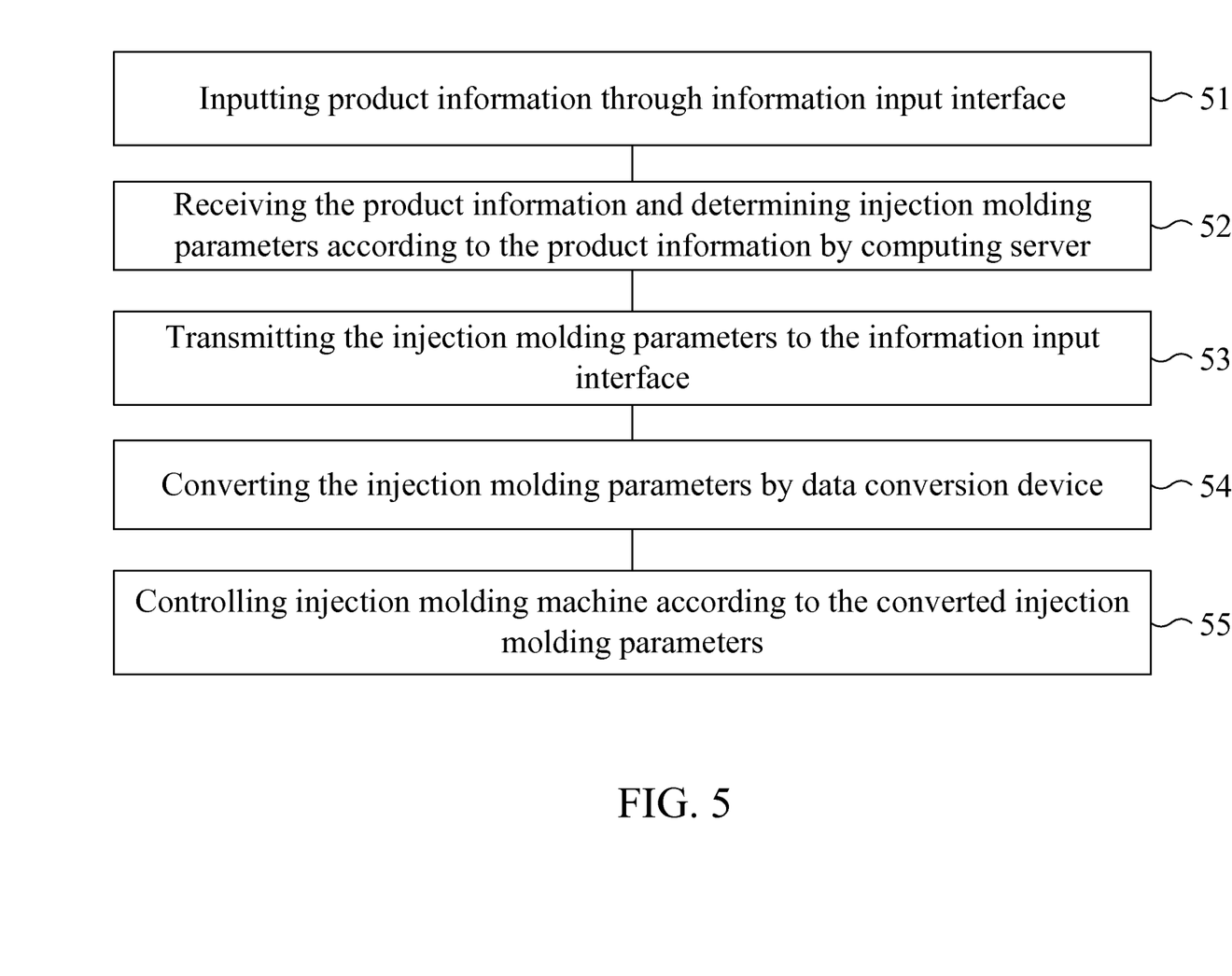
FIG. 5 is a flowchart illustrating a control method of manufacturing injection molding products according to an embodiment of the present invention.

Please refer to FIG. 5, a flowchart illustrating a control method of manufacturing injection molding products according to an embodiment of the present invention. The control method is used with the control system as described above. In step 51, production information is inputted through an information input interface. The product information includes a product length, a projection area, a product thickness, a product volume and a material of the injection molding product. In this step, the injection molding product is described to make the control system realize its contours. Sometimes, the injection molding product may be described in sections if the injection molding product has irregular shape and cannot be easily described. In this condition, more than one set of product information is inputted. The product information may be obtained via a 3D image of the injection molding product which is inputted to or acquired by the information input interface. Other product information such as gate thickness/diameter, runner volume ratio, average distance between pipe and mold surface, and model number of the injection molding machine may be inputted to assist in optimum parameter determination.

In step 52, the computing server receives the product information from the information input interface and determines the injection molding parameters of an injection molding process. The injection molding parameters include a melting temperature, a mold temperature, a filling time, an injection velocity, an injection pressure, a packing pressure, a packing time and a cooling time. To determine the injection molding parameters, the computing server selects or acquires various data from databases, e.g. an equipment database, a material database and a model database built in the computing server to calculate the injection molding parameters.

In step 53, the injection molding parameters are transmitted to the information input interface. The operator may see or monitor the injection molding parameters through a display (not shown) of the information input interface.

In step 54, the injection molding parameters are converted by a data conversion device. The converted injection molding parameters have a data format accepted by the injection molding machine. If there are a plurality of injection molding machines, this step may be performed by more than one data conversion device in a one-to-one manner or a one-to-many manner.

In step 55, the injection molding machine is controlled according to the converted injection molding parameters. In particular, the injection molding machine issues control signals according to the converted injection molding parameters to control the production conditions of the injection molding process.

The control method may further include, after step 52 or step 53, a step of adjusting the injection molding parameters. In an embodiment, the adjusting step is performed by the computing server. The computing server receives data from specified databases, e.g. a case database and/or a trouble-shooting database to adjust the injection molding parameters if the first calculated injection molding parameters may cause production failure according to the data recorded in the specified databases. In another embodiment, the computing server adjusts the injection molding parameters after an instant advice from at least one injection molding expert connected to the computing server. In a further embodiment, the injection molding parameters are adjusted through the information input interface or a portable device in communication with the computing server and the information input interface.

The control method may further include, after step 55, a step of monitoring the injection molding machine. In this step, actual values of the injection molding parameters of the injection molding machine and the determined injection molding parameters are compared to obtain a monitoring result. If the difference between the actual values and the determined injection molding parameters exceeds a threshold, an alarm is raised to actuate the information input interface to perform the above-described adjusting step. Another example is to compare average actual values of the injection molding parameters of the injection molding machine during several production cycles or a predetermined time period with the determined injection molding parameters. The control method goes to the adjusting step if the error exceeds a threshold.

According to the present control method, the injection molding parameters are principally determined according to the product information rather than operator's experience. After the product information is inputted, the injection molding process is controlled automatically and it is unnecessary for the operator to input the parameters manually through the control panel of the injection molding machine. Therefore, the control method facilitates systemization and automation of the injection molding process. It is advantageous to enhance the control and production efficiency.

While the disclosure has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control system of manufacturing injection molding products, comprising:
   an injection molding machine, configured to manufacture the injection molding products;
   an information input interface, configured to receive and transmit product information of the injection molding products;
   a computing server, in communication with the information input interface, configured to receive the product information transmitted from the information input interface, determine a plurality of injection molding parameters according to the product information, and transmit the injection molding parameters to the information input interface;
   a model database;
   a trouble-shooting database;
   a case database of injection molding parameters and associated results, wherein said injection molding parameters comprise melting temperature, a mold temperature, a filling time, an injection velocity, an injection pressure, a packing pressure, a packing time and a cooling time;

a user interface configured to display 4 intersected slopes based on said eight injection molding parameters, wherein an area defined by the 4 intersected slopes indicates optimum ranges for said injection molding parameters, wherein the user interface provides a capability to perform an adjustment of one or more injection molding parameters; and a data conversion device, in communication with the injection molding machine and the information input interface, configured to receive and convert the injection molding parameters from the information input interface, the converted injection molding parameters having a data format acceptable by the injection molding machine which is controlled according to the converted injection molding parameters.

2. The control system according to claim 1, wherein the information input interface is a server or a computer.

3. The control system according to claim 1, wherein the computing server is a cloud server or a workstation.

4. The control system according to claim 1, wherein the computing server comprises:

an equipment database;

a material database;

a selection unit, in communication with the equipment database, the material database and the model database, configured to select data from the equipment database, the material database and the model database; and a calculation unit, in communication with the selection unit, configured to calculate the injection molding parameters according to the selected data.

5. The control system according to claim 4, wherein the computing server further comprises:

a defect identification unit, in communication with the case database, the trouble-shooting database and the calculation unit, configured to receive data from the case database and/or the trouble-shooting database to enable the calculation unit to adjust the calculated injection molding parameters according to the received data.

6. The control system according to claim 1, wherein the control system further comprises a portable device in communication with the information input interface and the computing server, configured to receive and show the injection molding parameters on a display of the portable device, the portable device providing an input window, the injection molding parameters received from the computing server being adjusted through the input window and then transmitted to the information input interface.

7. The control system according to claim 6, wherein the portable device is a tablet computer, a notebook computer, a smart communication apparatus or a personal digital assistant.

8. The control system according to claim 1, wherein the control system further comprises a monitor module in communication with the injection molding machine and the information input interface, the monitor module monitoring the injection molding machine and actuating the information input interface to adjust the injection molding parameters.

9. The control system according to claim 1, wherein the case database further comprises ordered collections of parameter settings and associated results, the parameter settings including a melting temperature, a mold temperature, a filling time, an injection velocity, an injection pressure, a packing pressure, a packing time and a cooling time, and the associated results including pass/fail results including codes for particular known defects.

10. The control system according to claim 9, wherein the user interface is able to display pairs of parameters on a two-dimensional plot, with individual points labeled according to the results obtained with the combinations of parameters shown on the x-axis and y-axis.

11. The control system according to claim 1, further comprising a technical support unit linking a user through the information input interface to an online interactive service, wherein the online interactive service puts the user into communication with at least one expert skilled in the use of the control system.

12. The control system according to claim 1, wherein the adjustment of one or more injection molding parameters is based on environmental condition.

* * * * *